United States Patent [19]

Pohio et al.

[11] 4,127,917

[45] Dec. 5, 1978

[54] PELTING OF ANIMALS

[76] Inventors: James N. Pohio, 3 Cridland St., Kaiapoi; Douglas E. Richards, 73 Te Awakura St., Christchurch 8; Angus A. J. Robertson, No. 1 R.D., Rangiora; William Williams, CLWYD, Main North Rd., Kaiapoi RD; Kenneth J. Garnett, 56 Godden Crescent, Mission Bay, Auckland, all of New Zealand

[21] Appl. No.: 815,004

[22] Filed: Jul. 12, 1977

[30] Foreign Application Priority Data

Jul. 12, 1976 [NZ] New Zealand ............... 181447

[51] Int. Cl.² ............................................. A22B 5/16
[52] U.S. Cl. .............................................. 17/21; 17/50
[58] Field of Search ................................. 17/21, 50

[56] References Cited

U.S. PATENT DOCUMENTS

| 2,494,138 | 1/1950 | De Moss | 17/50 X |
| 2,871,509 | 2/1959 | Poupet | 17/21 |
| 3,737,949 | 6/1973 | Davis | 17/50 X |

FOREIGN PATENT DOCUMENTS 251963  6/1964  Australia ......................... 17/21

*Primary Examiner*—Travis S. McGehee
*Attorney, Agent, or Firm*—Cushman, Darby & Cushman

[57] ABSTRACT

A pelting method which utilizes a roller which is engaged with the pelt at the head region of a worked up carcass which has been worked up so that the pelt can be removed by rolling substantially as a sheet. The rolling is effected in such a way that the inside of the pelt is exposed around the roller as the roller winds the pelt completely from the carcass. After the pelt has been removed the roller is reversed to allow the easy removal thereof.

39 Claims, 15 Drawing Figures

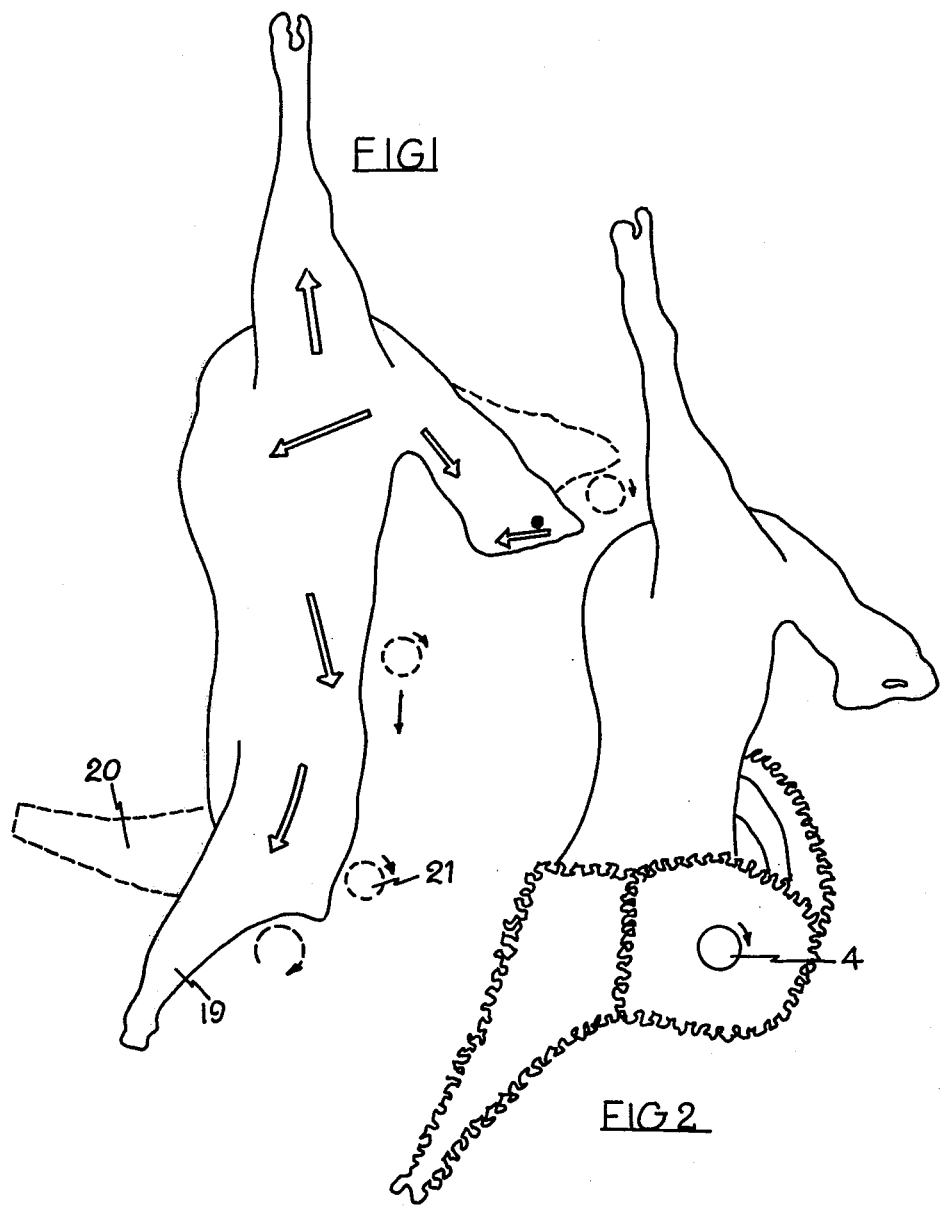

PELTING OF ANIMALS

BACKGROUND OF THE INVENTION (1. Field of the Invention

The present invention relates to improvements in or relating to the pelting of animals and apparatus suitable therefor and relates more particularly although not solely to the mechanical pelting of sheep and lamb carcasses.

(2. Description of the Prior Art

The slaughtering and processing of animals whether for beef, venison, mutton, hogget or lamb and the like has reached a high degree of sophistication, so that high throughputs are available over a limited killing season. One of the operations in the chain that causes a large amount of the difficulty involved in controlling the throughput occurs in regard to pelting, as it is desired to obtain a worthwhile pelt and leave the carcass in the best possible form without undue contamination. The present methods are largely manpower intensive and it seems desirable that some means should be provided whereby throughput is maintained, hygiene is improved, yet manpower is reduced. Also it is desirable that some means be provided whereby a skinned carcass is left in a better state both hygienically and aesthetically.

SUMMARY OF THE INVENTION

In one aspect the present invention consists in a method of pelting a carcass comprising the steps of
  (1) working up the carcass so that the pelt is removable substantially as a sheet rather than an envelope, save possibly the rear leg regions thereof,
  (2) engaging a portion of the head region of the pelt with a roller,
  (3) winding the roller so as to wind the pelt with the inside of the pelt exposed around the roller,
  (4) causing relative translational movement between the carcass and the rotating roller so that the roller moves along the contour of the backbone of the carcass pulling the pelt therefrom as it proceeds relative to the carcass, until such time as said pelt has been wound fully from the carcass and onto said roller, there being provided throughout at least a part of said removal, a component of force acting on the carcass to resist the pull and,
  (5) reversing the rotation of the roller to unwind the pelt therefrom.

In a further aspect the invention consists in a method of pelting a carcass of an animal selected from sheep, hoggets and lambs comprising the steps of,
  (1) working up the carcass so that the pelt is removable substantially as a sheet rather than an envelope, save possibly the rear leg portions thereof,
  (2) engaging a portion of the head region of the pelt with a roller while said carcass is suspended from the forelegs thereof,
  (3) winding the roller so as to wind the pelt with the inside of the pelt exposed around the roller when said roller and said carcass are so positioned that the head of the carcass will not follow the pelt around the roller,
  (4) moving the roller relative to said carcass so that the roller follows the backbone of the animal and at least a portion of the rear legs thereof pulling the pelt from said carcass as it proceeds and winding the same around itself until such a time as the pelt has been removed fully from the carcass, there being provided a component of force acting on the carcass by virtue of the front leg support of the carcass and gravity to resist the pull, and
  (5) reversing the rotation of the roller once the pelt has been rolled completely thereon to unwind the pelt therefrom.

In still a further aspect the invention consists in a method of pelting an animal selected from sheep, hoggets or lambs comprising the steps of,
  (1) working up the carcass so that the pelt thereof can be pulled therefrom at least the head, front leg, belly flank and backbone regions thereof substantially as a sheet rather than an envelope, winding the pelt from the carcass onto a roller in such a way that the inside of the pelt is exposed around the roller, the winding being effected as said roller moves from the head regions of the carcass to the rear legs thereof, the carcass being supported by its forelegs during such winding off of the pelt thereof.

In yet a further aspect the invention consists in apparatus for pelting an animal selected from sheep, hoggets and lambs comprising a chain capable of supporting the carcass to be pelted by forelegs thereof with the backbone of the carcass disposed away from the direction of movement of said chain, and a roller having its axis of rotation substantially parallel to the direction of movement of said chain at the pelting station, said roller being mounted from a support such that in one position said roller is adjacent to the head of a carcass supported in use on said chain at said pelting station when said head region is stretched outwards and another position away from said animal, the roller being capable between said positions of progressing from said first mentioned position to said second mentioned position while substantially following the contour of the backbone and at least a portion of the rear legs of said carcass, the roller including means capable of engaging a portion of the head region of the pelt of said animal when the pelt on the carcass has been appropriately worked up for pelting, winding said pelt from the carcass during the course of the roller's movement relative thereto so as to accumulate the pelt therearound with the inside of the pelt exposed, and reversing the direction of rotation thereof at said second mentioned position to assist in the removal of the pelt therefrom.

Preferably said chain has at some region close thereto and running substantially parallel in the same direction therewith a second chain conveyor capable of engaging the rear legs of the carcass during initial working up thereof prior to the carcass having the forelegs engaged with said first mentioned chain prior to the removal of the rear legs from said second mentioned chain.

Preferably said roller is mounted on an arm member actuable so as to take said roller close in use to a carcass supported on said chain to have the head region of the worked up pelt engaged therewith, move said roller away from the trunk of the carcass in order to ensure the head region is not wound on the roller once winding begins, following the carcass during the winding stages down the backbone regions of the animal and moving downwards further so as to take said roller some distance from the carcass prior to the re-winding thereof in order to ensure the pelt does not contact the carcass.

Preferably said means capable of engaging a portion of the head region of the pelt of said animal includes spike means.

Preferably said arm member extends from a pivot and a similar arm member supporting a second roller which acts in a similar way to the first mentioned said roller extends diametrically from said first mentioned arm member, the arrangement of the two arm members and the two rollers being such that each roller is usable for alternate carcasses being presented to the pelting station.

Preferably said arms and rollers are actuable to begin the pelting operation after the engagement of the head region of the worked up pelt with a said roller and thereafter the remaining steps in the pelting operation occur automatically including the rewinding of said roller.

BRIEF DESCRIPTION OF THE DRAWINGS

FIG. 1 which shows a skinned sheep's carcass that has been skinned in accordance with the preferred form of the method of the present invention, the drawing showing in dotted outline the position of the rotatable roller that was assumed during the skinning of the carcass and with the large outlined arrows showing the general direction of fell on a sheep's carcass, FIG. 2 shows a carcass of the type shown in FIG. 1 at the stage where the roller is at a position relative to the carcass where it overlies the rump.

DESCRIPTION OF THE PREFERRED EMBODIMENTS

Figure 3:
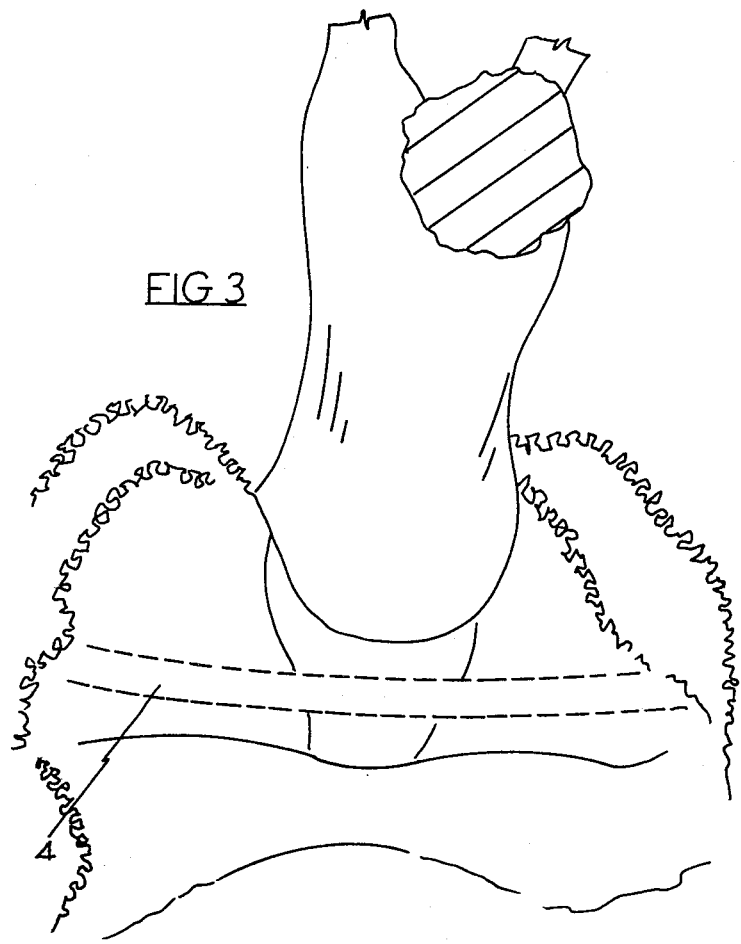
FIG. 3 shows a view looking down on the roller of a carcass skinned at the stage shown in FIG. 2.

The preferred forms of the present invention will now be described with reference to the drawings, however alternatives will be indicated, all of which fall within the ambit of the present invention.

The preferred form of the present invention is designed to ensure that there is a minimum of working up which will damage the fell of the animal while at the same time there is a minimum of contamination of the carcass as a result of such manual working up. A person skilled in the art will appreciate the working up necessary to ensure that a pelt is removable from a carcass as a sheet with the possible exception of the rear legs. In the preferred form of the present invention the roller is to move relative to the carcass along the backbone thereof in a direction from the head to the rear legs. To facilitate this therefore, it will be apparent that it is necessary that the skin be separated by the manual work up from the nose regions of the animal to the crutch with the fore leg regions and a portion of the head cleared. However, in other forms of the present invention the working up is different. In the preferred form of the present invention to ensure that there is a minimum of contamination as a result of having to reorientate the beast on the chain conveyor, the animal is supported by its fore legs. Such a system is considered desirable for several reasons. One of these is that the head of the animal must be retained until the inspection step, which occurs on the chain many steps down the line, i.e. immediately prior to the freezing step, if there is a freezing step. Another reason for using the fore legs as a means of support is to ensure that the best cuts on the animal have the fell retained thereon. A perusal of FIG. 1 shows with arrows the direction of the fell. It will be seen therefore that if a creature is supported by its fore legs and working up is done to enable the pelt to be pulled from the animal as a sheet, with exception of the rear legs, the only fell directions against which the pelting occurs are in the region of the neck of the animal and the fore legs. Hence the expensive cuts, for example the shoulder, the flank, the loin and the rear legs are all capable of having the pelt taken therefrom by the method of the present invention leaving the fell to overlie the globular fat to thereby not only protect the meat, but more importantly to make the meat aesthetic in appearance. The retention of the fell also serves a use in minimising moisture loss from the carcass during the freezing thereof whether the freezing is blast freezing or slow freezing.

In other forms of the present invention the carcass can be supported from the head, for example the jaw bone. This would mean that the system of the present invention would enable the pelt to be taken from the fore legs in the right direction to retain all of the fell. However this can lead to some difficulties over damaging the neck of the animal.

It will be appreciated that pelts can be removed against the grain of the fell. However, with a mechanical system which does not have obviously the finesse of a human pelting system, there is a tendency on average to damage the fell if the pelt is pulled against the direction of the fell.

In the preferred form of the present invention the animals to be pelted in accordance with the present invention are sheep or lambs. Ideally therefore the preferred working up method is substantially as follows:

(1) The animal is stunned and then spear stuck. Care must be taken that the atlas joint is not severed.
(2) The carcass is then suspended by the left rear leg on a conventional leg hook which is suspended from the main rail.
(3) The area around the anus is skinned right up to the inside tip of the tail.
(4) A slit cut is made from the anus through between the rear legs and up to a point just past the testes or udder.
(5) A small clearing cut is made between the legs separating the skin from the carcass to about 3 inches each side of the centre line.
(6) The fore legs are then placed in a conventional spreader which is lifted up on the spreader rail.
(7) The Y cut is then made and the neck and shoulders cleared in the conventional manner, the Y cut going down the fore legs to the point of the lower jaw.
(8) The checking is then carried out with the ear canals being severed during this operation.
(9) A cut is then made over the bridge of the nose separating the skin for a distance of about 3 inches up from the tip of the nose, the nose being removed with the skin.
(10) The brisket is then cleared by preferably using a conventional drill and spade but the pelt is not split.
(11) The rear trotters were cut off above the final joint and in doing this the rear leg is severed from the leg hook.
(12) The pelt (or skin) is then split with a knife from the brisket down to meet the opening already made between the rear legs.
(13) The pelt is then cleared around the navel area as far out as the "wax eyes" only.
(14) The shoulders are then pulled down far enough to allow a pocket to be made through the arch of the neck separating the pelt from the neck of the carcass.

The animal now has all the necessary manual preparation work-up done and is ready to be fed into the mechanical pelting unit.

The next step is the stripping from the carcass of the pelt using the mechanical method of the present invention. After the pelt has been removed the carcass is left supported by its fore legs and the chain proceeds. The following steps are then followed:

(1) The rear legs are cambrelled up and the remaining portion of the rear trotters are removed, the weasand is then cut and tied, the nose and throat passages are then washed (preferably using the gun flush system developed by Borthwicks), the anus is preferably ringed using a rubber ring in a conventional manner, the fore legs are removed from the spreader and the fore trotters removed, and the carcass then proceeds to evisceration etc. through a wash if this is found necessary. It will be appreciated that the head is still on as is required.

A person skilled in the art will appreciate the reasons why the preferred form of the present invention has the working up effected in the prescribed order, however it will be appreciated that any number of variations of the various steps is possible, and in fact some steps may be omitted altogether. The following points should be noted — (a) when cheeking the animal, it is desirable to keep the skin below the eye as to do so will ensure that all of the tear duct is removed with the pelt, (b) the cut at the ear canal is preferably such as to leave the ligament behind mainly because the ligament is hard to cut. It also lends some stability to the flesh on the neck of the animal, (c) the cutting of the rear legs preferably occurs between the hamstring and the fetlock using preferably hock cutters. The first cut is made near to the trotter prior to the pelting method and the second cut occurs higher up to remove any contaminated area at the base thereof. Of course the joint must be retained to ensure that there is a means whereby conventional gambrels can engage with the rear legs in subsequent steps. (d) The Atlas joint is not severed to ensure the head is adequately anchored.

The apparatus of the present invention will now be described briefly.

Figure 6:
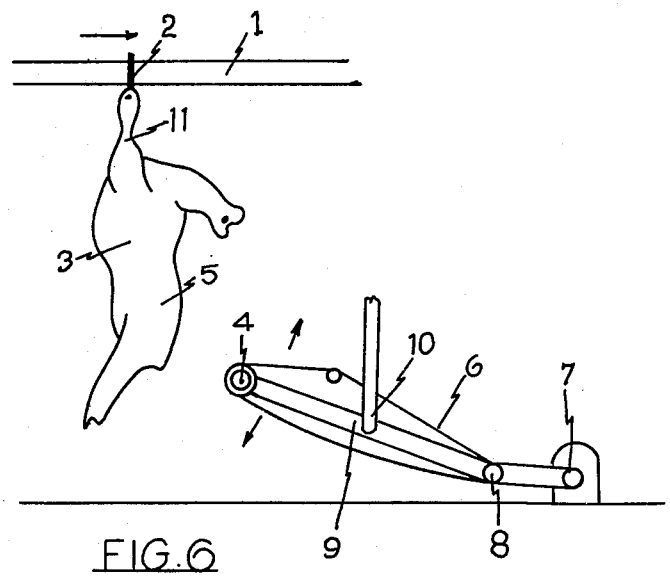
FIG. 6 shows diagrammatically one form of apparatus or system in accordance with the present invention, the system having the roller of the present invention movable so as to create the relative motion between the carcass and itself, the carcass being suspended from a chain conveyor which can move the carcass in a direction perpendicular to the rotational axis of the roller, FIG. 7 similarly shows the relative position between an alternative and more preferred form of the present invention and the chain conveyor on which the animal is movable, the chain conveyor in this embodiment being capable of moving the carcass in a direction into or out of the plane of the drawing, with the rotatable roller of the present invention movable relative to the carcass and with the rotational axis of the roller thereof parallel to the direction of movement of the chain conveyor.

In FIG. 6 is shown diagrammatically and partially a prototype type apparatus which was developed after initial tests were conducted using a manually rotated roller which was found to work effectively in accordance with the present invention. This form of roller comprises a chain 1 which has a narrow to medium width spreader 2 movable and mounted therefrom, the movement being in the direction of the arrow. The carcass 3 is mounted by the forelegs 11 therefrom. The apparatus of the present invention comprises a roller 4 which has the rotational axis thereof perpendicular to the direction of movement of the carcass on the chain conveyor 1. Of course since in the preferred form of the present invention the roller is to move with respect to the carcass rather than the carcass relative to the roller, provision is made for mounting the roller 4 in such a way that it can move vertically and to some extent laterally in a direction towards and away from the back 5 of the animal. Of course the process of the present invention can be conducted in such a way that as required the chain conveyor 1 can advance the animal 3 towards the roller 4.

The roller 4 is rotatable reversibly by a chain or belt drive 6 which is actuated by an electric motor 7. The frame of the apparatus is pivotted in a direction parallel to the rotational axis of the roller 4 preferably about a pivot point 8. The vertical movement of the frame etc of the apparatus 9 is caused by the weight of apparatus being greater than a counterweight mechanism which extends for example from region 10 upwards to a region above the chain conveyor 1. To avoid any cluttering such a counter balance mechanism can be offset from the remainder of the apparatus.

The counter balancing can be such that under the effect of gravity and also the rotation of the roller 4 pulling on the animal the frame 9 and hence the roller 4 will fall but is such that the lifting of the frame is made easier. However in some forms of the present invention a winch or the like could be associated with the apparatus to lift the apparatus again.

Figure 7:
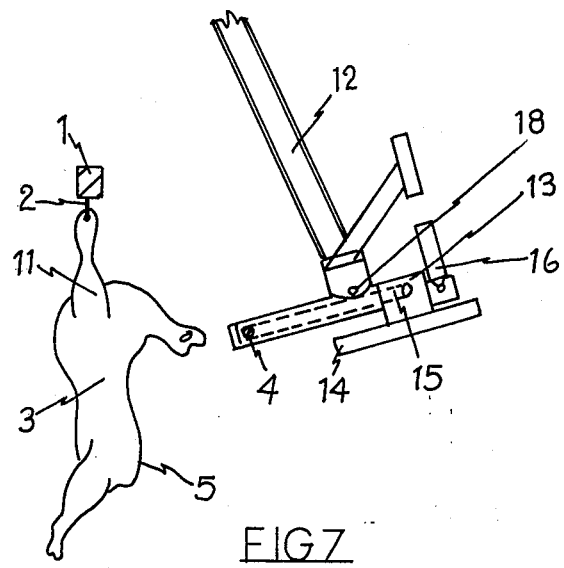
Figure 8:
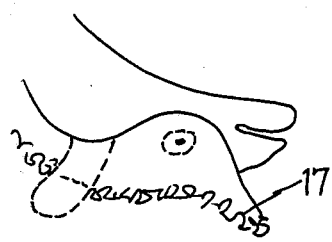
FIG. 8 shows in a sketch form the working up of the head of a sheep that occurs prior to engaging the nose regions of the pelt to a roller on an apparatus in accordance with the present invention and preferably of a kind as shown in either FIG. 6 or FIG. 7.

From the foregoing then it can be seen that the roller 4 can be positioned relative to the carcass 3 so as to follow as desired the contours whether in close proximity thereto or offset from the head, neck, back and rear leg regions of the animal. Such a following occurs as a result of the pivotting of the frame 9 about the pivot point 8 and the complementary movement as required of the carcass on the chain 1 and also the pivotting effect of the carcass about the spreaders 2. It will be appreciated however that the roller shown in the apparatus of FIG. 6 is movable only in a region whereby it is necessary to provide clearance for the beast over the apparatus after skinning has been completed. This it is believed is not the best form and accordingly in the preferred embodiment of the present invention as shown in FIG. 7, the rotational axis of the roller is parallel to the chain conveyor 1 rather than transverse to it as shown in FIG. 6. Of course in the embodiment of the present invention shown in FIG. 7, the spreader has to be rotated 90°.

In the embodiment shown in FIG. 7, the carcass 3 is mounted so that its back 5 is approachable laterally with respect to the movement along the chain conveyor 1 on the spreader 2. In the preferred form of the present invention the apparatus is mounted from structural members above the chain conveyor 1, for example on a telescoping arm or extendible guide member 12. The motor 13 is mounted on a frame region 14 which is pivotable with respect to the telescopic or extendible guide 12 about a pivot point 18. The roller 4 itself is again rotatable by a chain or pulley 15. The pivotting of the frame 14 and hence the vertical movement of the roller 4 caused thereby is actuable by pneumatic or hydraulic rams 16 in any known conventional manner. It can be seen therefore from FIG. 7 that the roller 4 can be arranged to follow the outline of the carcass as does the roller shown in the form of the invention in FIG. 6. This movement is obtainable owing to the movement of the extendible or telescopic support 12, and also by the pivotting effect of the carcass about the spreader 2. The pivot 18 and the means to pivot the apparatus about that pivot is adapted to provide some dwell time at various areas when the pelting operation strikes difficulties. However such features will be described in more detail later.

The feature of the present invention is the fact that the arrangement of the roller of the present invention is such that the pull of the pelt from the carcass occurs in advance of the positioning of the roller and certainly not behind it. The effect of such a pull can best be shown with reference to FIGS. 2, 3 and 4. The roller is denoted by the dotted lines 4.

It is a noticeable feature of the present invention however that there is a Vshaped pulling of the pelt from the backbone and flank regions of the carcass with the apex of the V being along the animal's backbone.

In the preferred form of the present invention after the work up as previously described, a nose region 17 is defined which is engageable with tangential spikes or a clamp positioned centrally on the roller 4. The roller 4 is then engaged therewith after the animal to be pelted is positioned adjacent thereto but at a distance such that there is a distance horizontally or substantially horizontally between the roller 4 and the head. This is so that when the roller 4 is rotated, the head does not tend to follow the pelt around the roller. At this stage therefore the removal of the skin is way in advance of the roller which rotates in a direction such that the inside of the pelt will always be on the outside of any pelt rolled on the roller.

The movement of the chain 1 or the apparatus of the present invention then ensures that the roller 4 follows the neck line of the animal inwards and the roller then proceeds, as shown in dotted lines which show various positions of the roller 4 (FIG. 1), down the backbone of the animal, imparting to the backbone and the flank, the characteristic V-shaped type pull shown in for example FIG. 2 and FIG. 3. This V-shaped pull is assisted by the accumulation of the head and neck regions of the pelt which are tightly wound around the roller 4 at the centre thereof. This differential in tension on the pelt does not damage the pelt but does assist in the clean removal of the pelt from the backbone and flank regions of the carcass without disrupting the fell.

Figure 4:
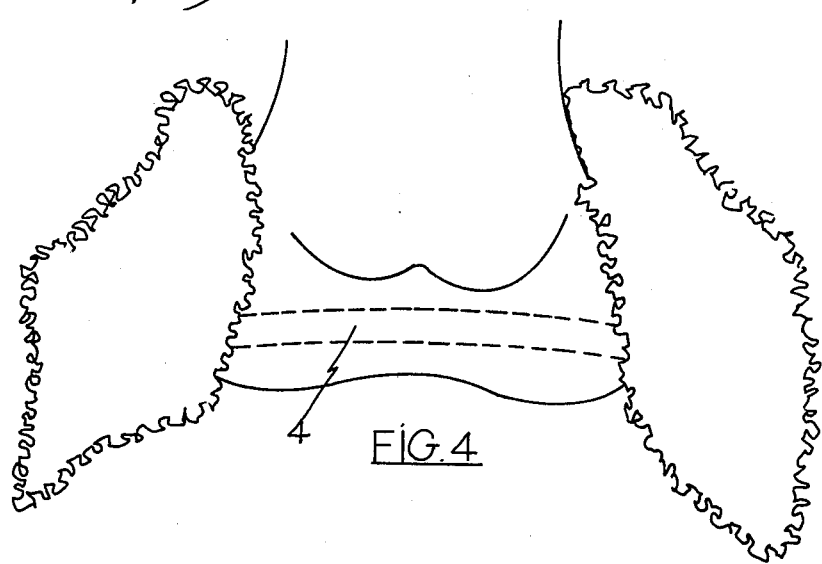
FIG. 4 shows the same carcass a few moments later.
Figure 5:
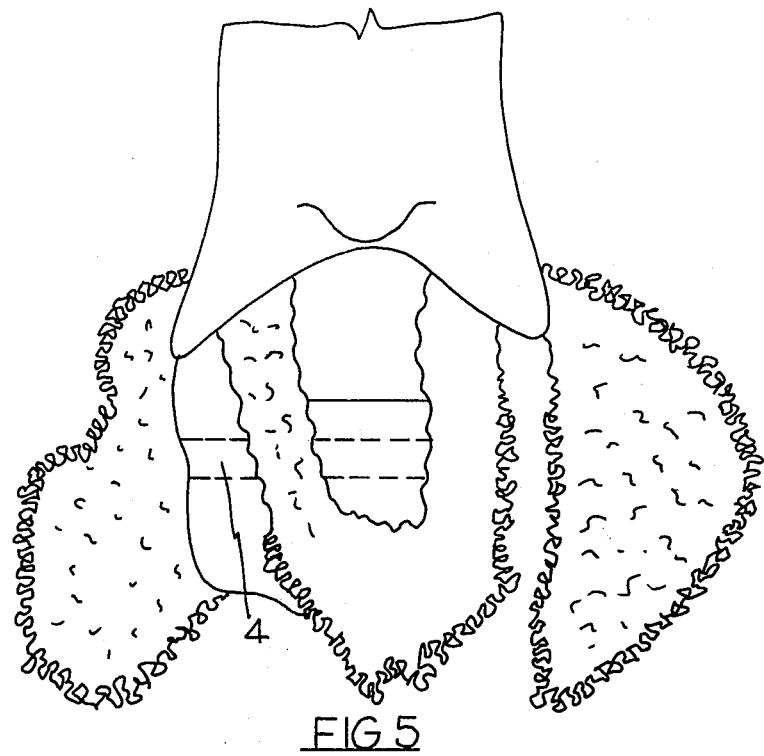
FIG. 5 is a view looking towards the back of the carcass showing the skinning of the carcass at a stage where the rear legs are having the pelt pulled from them. The figures just referred to show in dotted outline the position of the roller with respect to the animal.

When the roller is positioned as shown in FIG. 1 and denoted by the reference numeral 21 over the rump of the animal as shown in FIG. 4, the legs 19 of the animal tend momentarily to kick up to the position shown in outline as 20. If the movement of the roller is such that sufficient time is not allowed for this kicking up to occur the rear legs can be broken and accordingly a dwell period is preferably built into the movement of the roller at this stage. For this reason the pivot arrangement about the pivot point 18 using the actuating means pneumatic or hydraulic 16 can be programmed to provide the dwell time with its effect pivotting the roller 4 upwards to counteract substantially the downward effect of the still extending telescopic or extending member 12.

Once this kicking up has occurred this roller 4 continues to follow the contour of the body by going around behind the legs of the animal to completely pull the pelt from the animal. This is shown just prior to the pelt being completely removed from FIG. 4. In the preferred form the legs are pulled off as socks. In other forms the "socks" can be split during the work up.

The rolled pelt is immediately swung clear of the carcass so that no part of it contacts the carcass. The carcass continues advancing on the chain conveyor 1 and the roller 4 is unwound to remove the pelt therefrom, whereupon the apparatus is then ready for the next animal on the conveyor.

In the preferred form of the present invention the apparatus will be adapted so that it moves automatically while the stationary roller is being engaged with the nose regions of the animal. It will be appreciated however that the apparatus of the present invention is versatile and can be used on cattle and other beasts. The apparatus of the present invention moves down the backbone from neck to rear. This can be reversed but with an adverse effect on the quality of the skinned beast. It should be noted that such movement can occur as a result of the beast moving with respect to the roller.

Developments of the invention are capable and these include the use of a flexible roller, the use of the present invention in cases where the animal is supported from the rear legs if the head has to be removed or the animal has to be slaughtered by having its throat cut and the like. With the preferred form of the present invention however, eight second cycles are possible once the pelt of the animal has been attached to the roller. In fact it has been found that a cycle of down to one second is possible with the faster speed improving the quality of the final skinning. However the faster the time the more damage that can possibly occur due to the kicking up of the rear legs and it is therefore desirable to hold the cycle time to about four seconds.

A person skilled in the art will appreciate other points that should be considered, for example the width of the spreaders for the front legs. It is to be noted that while effective skinning can occur using wide spreaders pulling of the shoulders can occur.

Qualities of such a system may be summarised as follows:

Advantages seen in Present System (1) Almost complete elimination of contamination in rear leg and loin area, because no legging or flanking is required, and removal is done mechanically (2) Reduced contamination in brisket and belly area as the skin is not split while the carcass is in the horizontal position, but left until it is vertical and at this stage the flaps tend to roll away from the carcass rather than into it.

(3) With milky udders in ewes these can be removed in the area where the wax eyes are being cleared; in this position the carcass is hanging by its fore legs so that any contamination from the udder falls away from the carcass.

(4) The weasand being tied while the carcass is still lying in a downward position means that any ingesta in the weasand can be pushed down into the belly as gravity helps in this case.

(5) It is hoped with the reduced contamination that: no pre-evisceration wash will be required, and there will be a reduction in the amount of carcasses on the detain rail, due to contamination.

(6) Reduction in the number of down graded pelts due to torn butts, etc.

(7) Better pelt shape and addition of pelt area due to increase in neck length.

(8) Reduction in chain length, with associated space savings.

(9) Reduction in number of men required in the pelting process.

Disadvantages (1) Increased work in fellmongering as head piece is left on and the rear socks are not split. (It is hoped that eventually this will be overcome by splitting socks while they are rolled up on the roller on the machine and also remove the head piece by unwinding the pelt off the roller until it hangs vertically. Remove the head piece then before unclamping it from the machine).

(2) Mutilations due to mechanical pelting, which will always be a problem as the machine does not know to stop when a fault occurs. (It is hoped to get the percentage of mutilations down to that obtained with manual pelting at present).

Advantages 1, 6, 7, 8 and 9 are a result of the machine removal technique incorporated in the method of the present invention. Advantages 2, 3 and 4 result from the preferred dressing method of the present invention, while advantage 5 is a result of the combination of any some or all of advantages 1 to 4.

Figure 9:
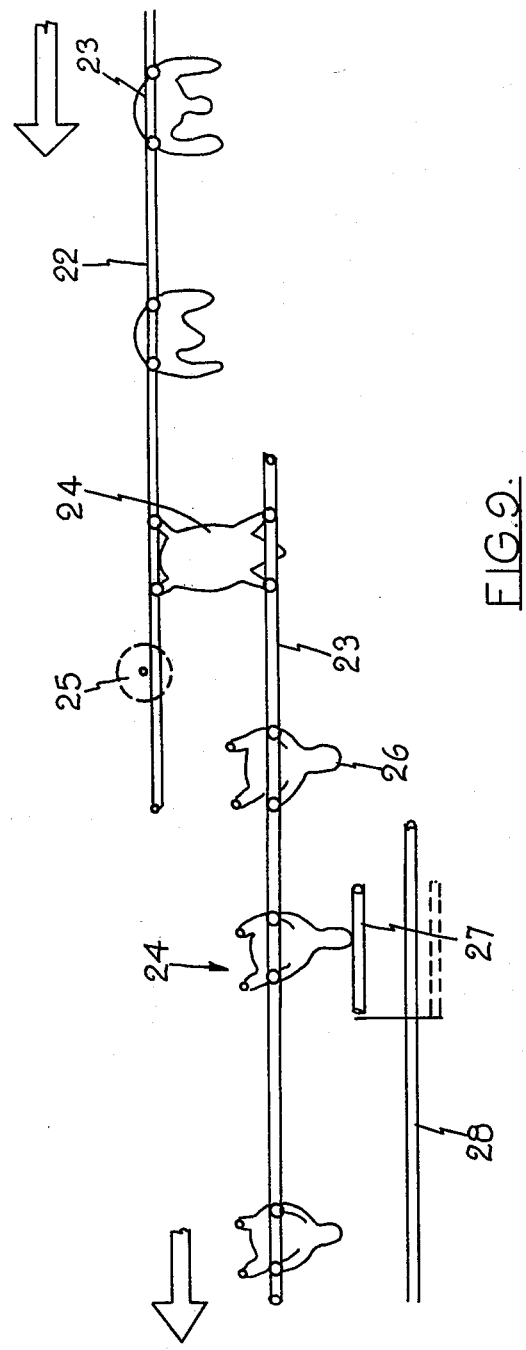
FIG. 9 is a plan diagrammatic view of the most preferred form of the present invention showing a first chain conveyor on which a slaughtered sheep, hogget or lamb is first supported by its rear legs for initial working up so that when it has been initially worked up it can have the forelegs thereof engaged with a substantially parallel second chain conveyor prior to having the rear legs removed from said first chain conveyor (e.g. by cutting off the hooves), the second mentioned chain being adapted to present the carcass when worked up in a manner supported by its forelegs to the roller at the pelting station, the position of the roller being shown relative to such a carcass.

The preferred embodiments previously described utilize apparatus of a type that is adequate for the purpose. However for high speed volume pelting steps the apparatus as shown in FIGS. 9 to 15 should preferably be utilized. In FIG. 9 there is shown a first chain conveyor 22 which has a carcass 23 suspended therefrom by the rear legs while initial working up is effected, e.g. the "Y" cut and clearing of the head regions and possibly also, in addition to the regions previously described, the nape of the neck. The chain 22 it can be seen engages both legs of the animal and this is important bearing in mind the transferal of the carcass which occurs substantially at the position indicated by the carcass 24 which also has the fore legs thereof supported by a chain conveyor, in this case, the chain conveyor, 23 which will move the same to the pelting station 24. The large arrows show the general directions of movement of both chain conveyors 22 and 23. From the diagrammatic drawing (FIG. 9) it can be seen that a means 25 can be provided which will cut the hooves or the like from the carcass thereby allowing the carcass as shown by carcass 26 to be suspended as required for presentation at the pelting station 24 by the fore legs only, with the worked up carcass being such that the pelt is removable substantially as a sheet except for the rear legs which are removable as socks. The means 25 can be a circular saw in conjunction with suction means to remove chips of flesh and bone or ideally some cutting or shearing member. It can be seen therefore that the transferal of the animal from its rear legs is easily accomplished without any heavy work.

Shown in FIG. 9 is the preferred position of the roller 27 for engagement thereof with the head of the animal to have the pelt removed therefrom. Shown in dotted outline is the position of the roller when the same is being reversed to enable the pelt to be removed therefrom. The dotted outline in the preferred form of the present invention also in this case shows the position of the second roller which will be described shortly with reference to the remaining figures. A rail or the like 28 is provided along which the mechanism mounting the rollers 27 can move slidably or adjustably so that the roller is kept at a fixed position with respect to the carcass having the pelt removed therefrom if in fact the movement of the chain conveyor 23 is to be continuous. If however the movement of the chain 23 is intermittent, then the roller 27 can be positioned at the required position relative to the longitudinal range of positions with respect to the rail 28.

Figures 10, 12:
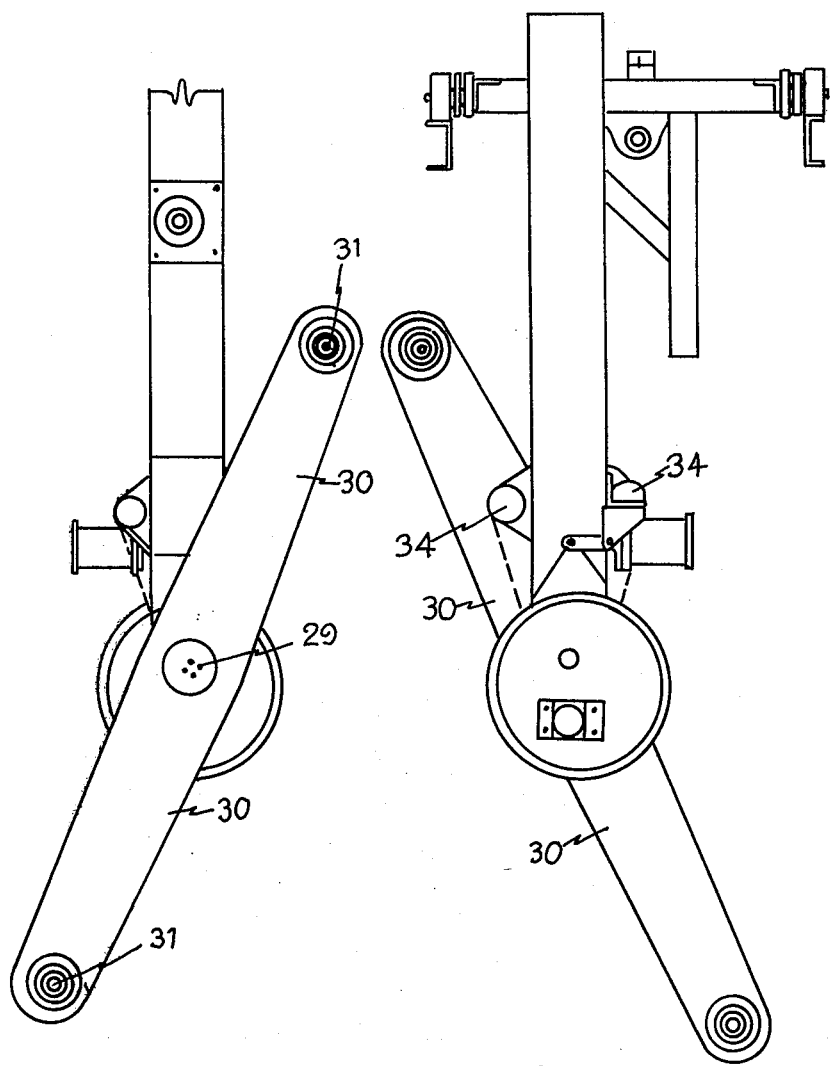
FIG. 10 shows the preferred roller mounting of the present invention in a side elevation looking into the axis of rotation of said roller, there being provided two similar rollers mounted from diametrically opposed arm members capable of being pivotted by appropriate actuation means.
FIG. 12 is a further side elevation of the apparatus of FIGS. 10 and 11 but showing the same in a direction opposite to that shown in FIG. 10.
Figure 11:
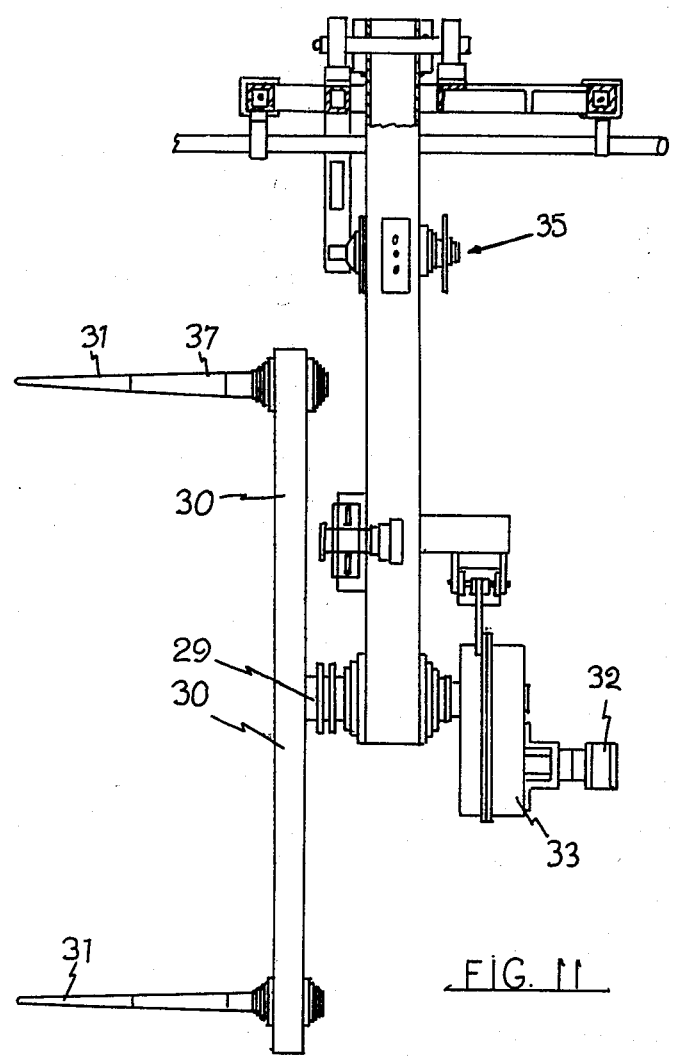
FIG. 11 is a side elevation of the apparatus shown in FIG. 10 but showing the apparatus with the axis of rotation of said rollers lying in the plane of the drawing.

In FIGS. 10 to 12 there is shown the pivot 29 from which the diametrically opposed arms 30 are mounted so as to be able to be rotated about the pivot 29. Positioned adjacent the distal end of each arm 30 is a roller 31. Bearing in mind the detail contained in FIGS. 10 to 12 a full description of the various components is not necessary. It is sufficient however to advise that reference numeral 32 indicates a hydraulic motor capable of acting through a torque reducer 33 which is actuable to rotate the arms 30 about the pivot 29. Also there are provided two motors 34 connected for example by pulleys or the like to means so that upon appropriate actuation thereof a said roller 31 can be selectively rotated one way or the other. Ideally all the motors of the apparatus are hydraulic. This however does not include for example, an electrical control cam or the like arrangement 35 adapted to move the supporting structure for the arms 30 etc. with respect to the rail 28 indicated on FIG. 9.

Figure 13:
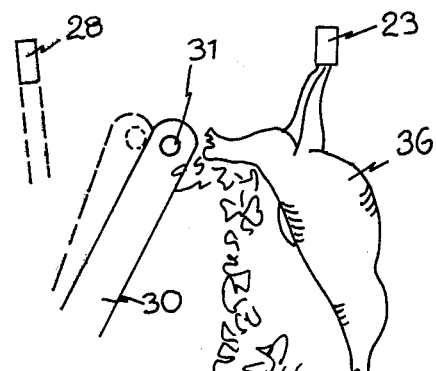
FIG. 13 shows the positioning of a said roller relative to a worked up carcass prior to the rolling of the pelt therefrom, the dotted outline showing the position which the roller will assume before rolling occurs in the preferred form in order to minimise the likelihood that the head will be taken with the pelt around the roller.
Figure 14:
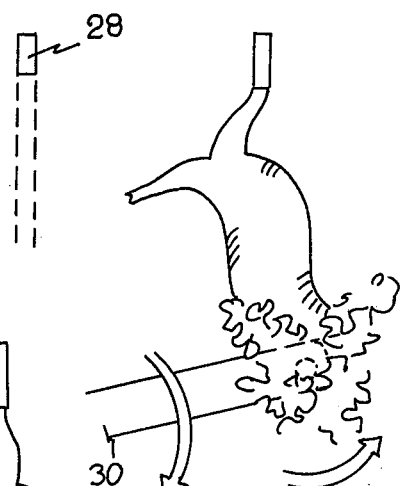
FIG. 14 is a similar view to that shown in FIG. 13 but showing the legs of the carcass kicking up as the pelt is being rolled therefrom as said arm is moved downwards and the roller rotates, the pivotal movement of said arm being shown by an arrow and the direction of rotation of said roller being shown by a further arrow.
Figure 15:
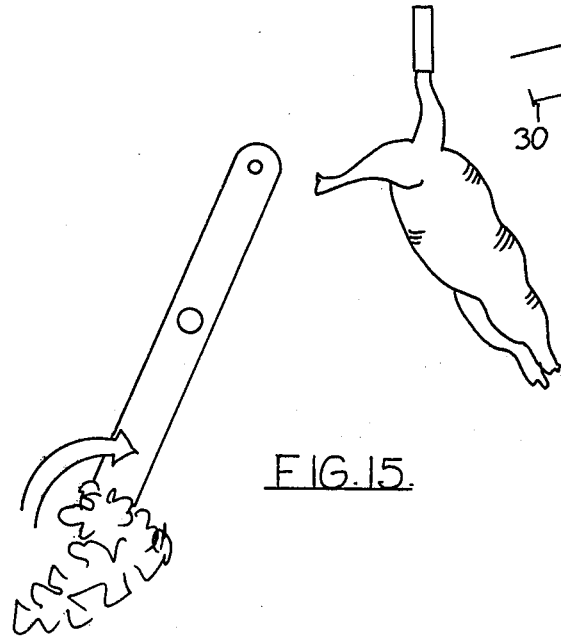
FIG. 15 shows a similar view but with the arm member swung around its pivot point so that the roller with the pelt wound thereon is remote from the carcass, whereupon the roller reverses its direction as shown by the arrow in order to remove the pelt therefrom, the arrangement with the diametrically opposed arms and similar rollers being such that when in the position shown in FIG. 15 the other roller is already positioned ready to be engaged with the pelt as was the first roller when as shown in FIG. 13.

In the preferred form of the present invention a detailed control circuit is provided in order to obtain the required movements. Such a control circuit is largely hydraulic in character. The arrangement can best be described with reference to FIGS. 13 to 15. Firstly a carcass 36 suspended on the chain conveyor 23 by its fore legs has its head region which has been worked up as shown in FIG. 13 positioned proximate to a roller 31. The head region and preferably the nose region of the pelt thereof is engageable with spike means or the like 37 on that roller, whereupon a switching mechanism is actuated which first moves the arm 30 to the position shown in dotted outline in FIG. 13 which pulls the head tight against the restraints on the forelegs thereof and the component of force resulting from gravity acting on the trunk of the carcass. It is only at this stage that the roller starts to rotate and such rotation having regard to FIG. 13 would be anti-clockwise. Once the rolling occurs the arm 30 moves down the backbone of the animal as indicated in FIG. 14 while the pelt is accumulated as previously described therearound. Of course as the arm 30 is lowered the corresponding arm 30 diametrically opposed thereto lifts. The actuation of the motor 32 is such that once the pelt has been fully cleared from the animal, the position as indicated in FIG. 15 is achieved before switching means causes the roller to reverse, i.e. rotate clockwise in order to unwind the pelt therefrom. It can be seen from FIG. 15 however that the position of the unwinding of the pelt is such that there is no risk that the pelt will contact the carcass from which it is removed. This is necessary in order to meet hygiene restrictions. With the preferred form of the present invention however it also means that the roller 31 that had not been used to remove the pelt is presented at a position ready for the recommencement of the cycle beginning with the fixing of the pelt to the roller as described with regard to FIG. 13. This positioning therefore means that no adjustment is necessary in order to position a roller appropriately for the following carcass on the chain 23.

The switching circuitry can be of any type, provided the required movements occur and preferably the switching is such that all movements occur automatically after a switch is thrown after the pelt has been engaged with the roller. In some forms of the present invention however, the switching means could be associated with the roller so that the movement starts after a short delay after the engagement of the pelt therewith. However such variations of course are still within the scope of the present invention. It is for this reason that it has not been felt necessary to describe in detail the actual circuitry utilized.

Obviously some difficulties will arise in use, if in fact the quality of the animals to be pelted vary significantly. In this respect some adjustability should be built into the apparatus. Ideally also some cutting off mechanism should be provided in the event of the tearing of the pelt or the head being rolled around the roller with the pelt. This is in order to minimise the time necessary to deal with abnormal carcasses which would be mutilated by the apparatus.

In use it is found that in some seasons Merino sheep present special difficulties owing to the dryness and relative thinness of their pelt. However with the general type of lamb, hogget or sheep that is considered as having meat of a quality suitable for export, there is reasonable consistency in the characteristics of the pelts, thus making the machine removing technique of the present invention feasible.

From the foregoing then it can be seen that the present invention provides a significant advance in the pelting technique art.

What we claim is:

1. A method of pelting a carcass comprising the steps of
   (1) working up the carcass so that the pelt is removable substantially as a sheet rather than an envelope, save possibly the rear leg regions thereof, said working up not clearing the pelt to any substantial degree from the rear legs thereof,
   (2) engaging a portion of the head region of the pelt with a roller,
   (3) winding the roller so as to wind the pelt with the inside of the pelt exposed around the roller, while said carcass is suspended by its forelegs, with its rear legs free, and its head does not overlie the remainder of the carcass except possibly lower back regions thereof,
   (4) causing relative translational movement between the carcass and the rotating roller so that the roller moves along the contour of the backbone of the carcass pulling the pelt therefrom as it proceeds relative to the carcass and from the free rear legs thereof, until such time as said pelt has been wound fully from the carcass and onto said roller, there being provided throughout at least a part of said removal, a component of force acting on the carcass to resist the pull and,
   (5) reversing the rotation of the roller to unwind the pelt therefrom.

2. A method as claimed in claim 1 wherein said carcass is worked up so that said pelt can be pulled from the carcass as a sheet except for the rear legs which must be pulled as socks.

3. The method as claimed in claim 2 wherein the lower portion of all of the legs have been removed.

4. A method as claimed in claim 1 wherein said roller is substantially round in transverse section and has a diameter within the range of substantially 1 inch to substantially 1¼ inch.

5. A method as claimed in claim 1 wherein the nose region of the pelt is engaged with said roller.

6. A method as claimed in claim 1 wherein the relative translational movement results from a downward movement of said roller relative to the carcass, the component of force acting on the carcass to resist the pull resulting from the restraints on the forelegs of said carcass and gravity acting on the bulk of the carcass.

7. A method as claimed in claim 1 wherein step 5 is effected a distance from the carcass so that during the unwinding of the pelt therefrom there is no risk of the pelt contacting the carcass.

8. A method as claimed in claim 1 wherein the relative translational movement and the rotation of said roller is effected so that the line of separation between the carcass and the pelt is not behind the movement of the roller relative to the carcass.

9. A method as claimed in claim 1 wherein said roller has its axis of rotation substantially parallel to the direction of movement of said carcass to and from the pelt removing station, the movement of said carcass to and from said pelt removing station being defined by a chain conveyor system which supports the carcass by the forelegs with the back of the carcass disposed transversely to the direction of advancement.

10. A method as claimed in claim 9 wherein initial working up of the carcass is effected while the carcass is supported by its rear legs on a different chain conveyor, the carcass subsequently having its forelegs engaged with said first mentioned chain conveyor which is a substantially parallel moving conveyor at the region of foreleg attachment and then having the rear legs removed from said different chain conveyor.

11. A method as claimed in claim 10 wherein said rear legs have the lowermost regions thereof removed from the carcass while said carcass is suspended from both of said chain conveyors.

12. A method of pelting a carcass of an animal selected from sheep, hoggets and lambs comprising the steps of,
(1) working up the carcass so that the pelt is removable substantially as a sheet rather than an envelope, save possible the rear leg portions thereof, said working up not clearing the pelt to any substantial degree from the rear legs thereof,
(2) engaging a portion of the head region of the pelt with a roller while said carcass is suspended from the forelegs thereof and the rear legs are hanging freely,
(3) winding the roller so as to wind the pelt with the inside of the pelt exposed around the roller when said roller and said carcass are so positioned that the head of the carcass will not follow the pelt around the roller,
(4) moving the roller relative to said carcass so that the roller follows the backbone of the animal and at least a portion of the rear legs thereof pulling the pelt from said carcass as it proceeds and winding the same around itself until such a time as the pelt has been removed fully from the carcass, there being provided a component of force acting on the carcass by virtue of the front leg support of the carcass and gravity to resist the pull, and
(5) reversing the rotation of the roller once the pelt has been rolled completely thereon to unwind the pelt therefrom.

13. A method as claimed in claim 12 wherein said carcass is worked up so that said pelt can be pulled from the carcass as a sheet except for the rear legs which must be pulled as socks.

14. The method as claimed in claim 13 wherein the lower portion of all of the legs have been removed.

15. A method as claimed in claim 12 wherein said roller is substantially round in transverse section and has a diameter within the range of substantially 1 inch to substantially 1¼ inch.

16. A method as claimed in claim 12 wherein the nose region of the pelt is engaged with said roller.

17. A method as claimed in claim 12 wherein the relative translational movement results from a downward movement of said roller relative to the carcass, the component of force acting on the carcass to resist the pull resulting from the restraints on the forelegs of said carcass and gravity acting on the bulk of the carcass.

18. A method as claimed in claim 12 wherein step 5 is effected a distance from the carcass so that during the unwinding of the pelt therefrom there is no risk of the pelt contacting the carcass.

19. A method as claimed in claim 12 wherein the relative translational movement and the rotation of said roller is effected so that the line of separation between the carcass and the pelt is not behind the movement of the roller relative to the carcass.

20. A method as claimed in claim 12 wherein said roller has its axis of rotation substantially parallel to the direction of movement of said carcass to and from the pelt removing station, the movement of said carcass to and from said pelt removing station being defined by a chain conveyor system which supports the carcass by the forelegs with the back of the carcass disposed transversely to the direction of advancement.

21. A method as claimed in claim 20 wherein initial working up of the carcass is effected while the carcass is supported by its rear legs on a different chain conveyor, the carcass subsequently having its forelegs engaged with said first mentioned chain conveyor which is a substantially parallel moving conveyor at the region of foreleg attachment and then having the rear legs removed from said different chain conveyor.

22. A method as claimed in claim 21 wherein said rear legs have the lowermost regions thereof removed from the carcass while said carcass is suspended from both of said chain conveyors.

23. A method of pelting an animal selected from sheep, hoggets or lambs comprising the steps of,
(1) working up the carcass without substantially clearing the pelt from the rear legs thereof so that the pelt thereof can be pulled from at least the head, front leg, belly flank and backbone regions thereof substantially as a sheet rather than an envelope, winding the pelt from the carcass onto a roller in such a way that the inside of the pelt is exposed around the roller, the winding being effected as said roller moves from the head regions of the carcass to the rear legs thereof, the carcass being supported by its forelegs only during such winding off of the pelt thereof.

24. A method as claimed in claim 23 wherein said carcass is worked up so that said pelt can be pulled from the carcass as a sheet except for the rear legs which must be pulled as socks.

25. The method as claimed in claim 23 wherein the lower portion of all of the legs have been removed.

26. A method as claimed in claim 23 wherein said roller is substantially round in transverse section and has a diameter within the range of substantially 1 inch to substantially 1¼ inch.

27. A method as claimed in claim 23 wherein the nose region of the pelt is engaged with said roller.

28. A method as claimed in claim 23 wherein the relative translational movement results from a downward movement of said roller relative to the carcass, the component of force acting on the carcass to resist the pull resulting from the restraints on the forelegs of said carcass and gravity acting on the bulk of the carcass.

29. A method as claimed in claim 23 wherein step 5 is effected a distance from the carcass so that during the unwinding of the pelt therefrom there is no risk of the pelt contacting the carcass.

30. A method as claimed in claim 23 wherein the relative translational movement and the rotation of said roller is effected so that the line of separation between the carcass and the pelt is not behind the movement of the roller relative to the carcass.

31. A method as claimed in claim 23 wherein said roller has its axis of rotation substantially parallel to the direction of movement of said carcass to and from the pelt removing station, the movement of said carcass to and from said pelt removing station being defined by a chain conveyor system which supports the carcass by the forelegs with the back of the carcass disposed transversely to the direction of advancement.

32. A method as claimed in claim 23 wherein initial working up of the carcass is effected while the carcass is supported by its rear legs on a different chain conveyor, the carcass subsequently having its forelegs engaged with said first mentioned chain conveyor which is a substantially parallel moving conveyor at the region of foreleg attachment and then having the rear legs removed from said different chain conveyor.

33. A method as claimed in claim 32 wherein said rear legs have the lowermost regions thereof removed from the carcass while said carcass is suspended from both of said chain conveyors.

34. Apparatus for pelting an animal selected from sheep, hoggets and lambs comprising a chain capable of suspending the carcass to be pelted by forelegs thereof with the rear legs free and with the backbone of the carcass disposed away from the direction of movement of said chain, and a roller having its axis of rotation substantially parallel to the direction of movement of said chain at the pelting station, said roller being mounted from a support to move in an arcuate path such that in one position said roller is adjacent to the head of a carcass supported in use on said chain at said pelting station when said head region is stretched outwards and another position away from said animal, the roller being capable between said positions of progressing from said first mentioned position to said second mentioned position while substantially following the contour of the backbone and at least a portion of the rear legs of said carcass, the roller including means capable of engaging a portion of the head region of the pelt of said animal when the pelt on the carcass has been appropriately worked up for pelting, winding said pelt from the carcass during the course of the roller's movement relative thereto so as to accumulate the pelt therearound with the inside of the pelt exposed, and reversing the direction of rotation thereof at said second mentioned position to assist in the removal of the pelt therefrom.

35. Apparatus as claimed in claim 34 wherein said chain has at some region close thereto and running substantially parallel in the same direction therewith a second chain conveyor capable of engaging the rear legs of the carcass during initial working up thereof prior to the carcass having the forelegs engaged with said first mentioned chain prior to the removal of the rear legs from said second mentioned chain.

36. Apparatus for pelting an animal selected from sheep, hoggets and lambs comprising a chain capable of supporting the carcass to be pelted by forelegs thereof with the backbone of the carcass disposed away from the direction of movement of said chain, and a roller having its axis of rotation substantially parallel to the direction of movement of said chain at the pelting station, said roller being mounted from a support such that in one position said roller is adjacent to the head of a carcass supported in use on said chain at said pelting station when said head region is stretched outwards and another position away from said animal, the roller being capable between said positions of progressing from said first mentioned position to said second mentioned position while substantially following the contour of the backbone and at least a portion of the rear legs of said carcass, the roller including means capable of engaging a portion of the head region of the pelt of said animal when the pelt on the carcass has been appropriately worked up for pelting, winding said pelt from the carcass during the course of the roller's movement relative thereto so as to accumulate the pelt therearound with the inside of the pelt exposed, and reversing the direction of rotation thereof at said second mentioned position to assist in the removal of the pelt therefrom, said support including an arm member actuable so as to take said roller close in use to the carcass to have the head region of the worked up pelt engaged therewith, move said roller away from the trunk of the carcass in order to ensure the head region is not wound on the roller once winding begins, following the carcass during the winding stages down the backbone regions of the animal and moving downwards further so as to take said roller some distance from the carcass prior to the rewinding thereof in order to ensure the pelt does not contact the carcass.

37. Apparatus as claimed in claim 36 wherein said arm member extends from a pivot and a similar arm member supporting a second roller which acts in a similar way to the first mentioned said roller extends diametrically from said first mentioned arm member, the arrangement of the two arm members and the two rollers being such that each roller is usable for alternate carcasses being presented to the pelting station.

38. Apparatus as claimed in claim 37 wherein said arms and rollers are actuable to begin the pelting operation after the engagement of the head region of the worked up pelt with a said roller and thereafter the remaining steps in the pelting operation occur automatically including the rewinding of said roller.

39. Apparatus for pelting an animal selected from sheep, hoggets and lambs comprising a chain capable of supporting the carcass to be pelted by forelegs thereof with the backbone of the carcass disposed away from the direction of movement of said chain, and a roller having its axis of rotation substantially parallel to the direction of movement of said chain at the pelting station, said roller being mounted from a support such that in one position said roller is adjacent to the head of a carcass supported in use on said chain at said pelting station when said head region is stretched outwards and another position awat from said animal, the roller being capable between said positions of progressing from said first mentioned position to said second mentioned position while substantially following the contour of the backbone and at least a portion of the rear legs of said carcass, the roller including spike means capable of engaging a portion of the head region of the pelt of said animal when the pelt on the carcass has been appropriately worked up for pelting, winding said pelt from the carcass during the course of the roller's movement relative thereto so as to accumulate the pelt therearound with the inside of the pelt exposed, and reversing the direction of rotation thereof at said second mentioned position to assist in the removal of the pelt therefrom.

* * * * *